Dec. 27, 1960     E. FRANKLIN     2,966,665
INDICATING SYSTEMS FOR RING SCALING CIRCUITS
Filed Aug. 9, 1957     2 Sheets-Sheet 1

Inventor
Ernest Franklin
By   Larson and Taylor
Attorneys

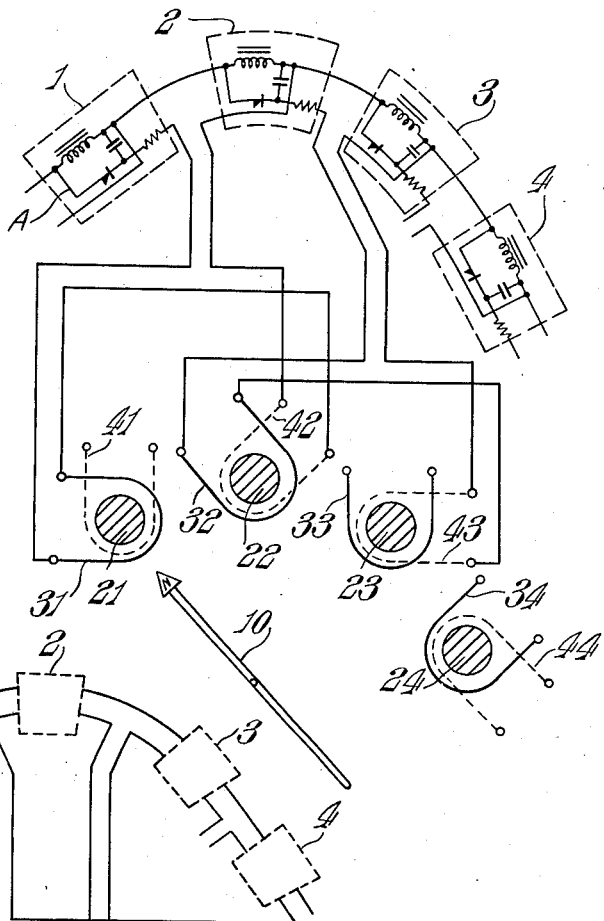
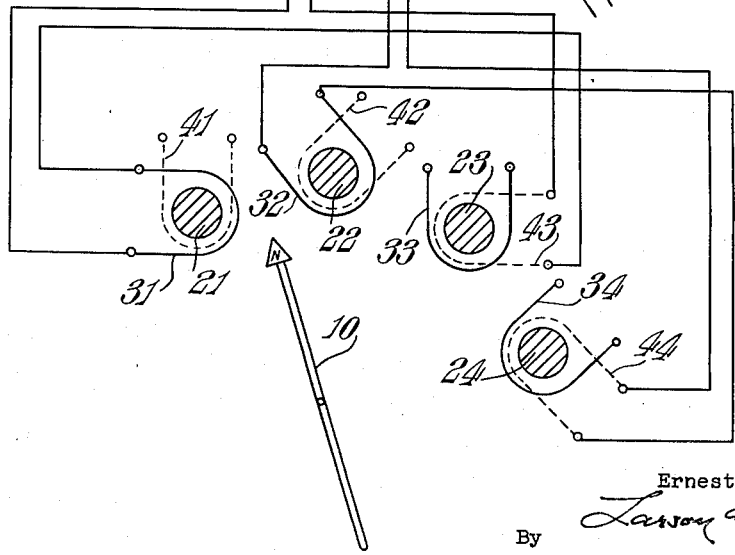

United States Patent Office 2,966,665
Patented Dec. 27, 1960

---

2,966,665

INDICATING SYSTEMS FOR RING SCALING CIRCUITS

Ernest Franklin, Abingdon, England, assignor to The United Kingdom Atomic Energy Authority, London, England Filed Aug. 9, 1957, Ser. No. 677,389

Claims priority, application Great Britain Aug. 16, 1956

5 Claims. (Cl. 340—174)

This invention relates to indicating systems for ring scaling circuits.

The invention is particularly applicable to magnetic memory ring scaling circuits comprising a ring of bistable elements each having a high-remanence magnetic core and connected in a continuous shift circuit so that the pattern of stable states moves one element round the ring with each input pulse. A shift circuit of this type was described by Kodis, Ruhman and Woo in Paper 7 of the 1953 I.R.E. Convention on Computers. In ring scaling circuits of this type the conclusion of a count leaves one bistable element of the ring magnetised in a direction different from that of the remaining elements. The present invention provides means for indicating which element is so magnetised.

The invention can also be applied to ring scaling circuits in which the conclusion of a count leaves one element carrying a current and the remainder non-conducting or vice-versa, and is of particular value when the currents involved are very small as in the case of some transistor circuits.

According to the present invention an indicating system for a ring scaling circuit of bistable elements comprises means for establishing an external magnetic field associated with and corresponding to the state of each bistable element of the ring, and a compass needle device to indicate that element the associated field of which corresponds to a given state of the bistable element.

The means for establishing the external field may comprise the magnetised cores of a ring scaling circuit comprising a ring of high remanence magnetic cores, the direction of magnetisation of the external field corresponding to the state of the bistable element.

Alternatively the means for establishing the external field may comprise a separate ring of indicating cores, each said core having a winding whereby the core may be magnetised in correspondence with the state of the bistable element by currents flowing in the bistable element. The cores of the indicating ring may be of high remanence whereby the direction of magnetisation of each core may be reversed by current pulses flowing in the bistable element.

The compass needle device may comprise two compass needles rigidly mounted in spaced parallel relationship on a common axis with their respective similar poles pointing in opposite directions.

To enable the nature of the invention to be more readily understood, attention is directed by way of example to the accompanying drawings wherein:

Figs. 5 and 6 are semi-schematic diagrams of circuits for connecting the cores of the indicating ring of an indicating system according to the invention.

Figure 1:
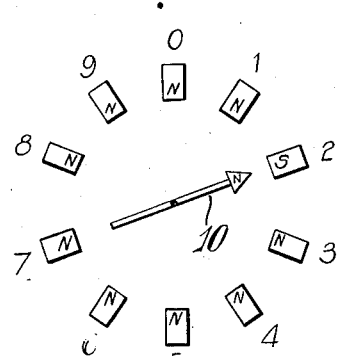
Fig. 1 is a diagram illustrating the principle of the invention.

Referring firstly to Fig. 1, magnetic cores 0–9 are part of the bistable elements of, or are associated with the bistable elements of, a scale-of-ten scaling circuit. The cores are arranged in a circle at the centre of which is pivoted a compass needle 10. Let it be assumed that, after the completion of a count, the cores have external magnetic fields such that one of them (core 2 in this example) presents a south pole towards the compass needle, and the remaining cores north poles. Then the needle will assume the position shown, with its north pole pointing towards core 2, thereby indicating the count.

Figure 2:
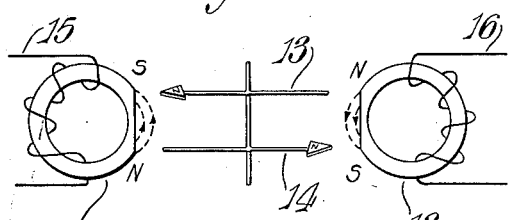
Fig. 2 illustrates one method of obtaining the external field and also the use of two compass needles.

Fig. 2 shows two saturable high-remanence cores 11 and 12 of toroidal form, corresponding respectively to cores 2 and 7 of Fig. 1, carrying windings 15 and 16. Each core forms part of a bistable element of a ring scaling circuit, the remaining cores of the ring having been omitted for the sake of clarity. The toroids are arranged with their centres lying on the circumference of a circle, the planes of the toroids being normal to the circumference. To produce an external field a portion of the toroid facing the centre of the circle is cut away and the core is magnetised assymmetrically by locating the winding or windings on teh remaining portion of the core. Since the latter portion is saturated, it follows that in the region of the cut-away portion some of the lines of force pass outside the core as shown. Alternatively nickel-molybdenum-iron alloy rectangular bar cores treated as described in the specification of co-pending U.S. application Serial No. 774,951, filed November 19, 1958, to acquire the necessary magnetic properties may be used.

As the magnetic fields produced by the cores may be quite small, it is important to prevent the earth's magnetic field affecting the position assumed by the compass needle. This can be achieved by using two compass needles 13 and 14 rigidly joined together on a common axis with their respective similar poles pointing in opposite directions. The effect of the earth's field is thus balanced out. Alternatively one needle can be used and the complete assembly mounted in a Mumetal can.

Where very small cores (below about 5/16 in. diameter) are used in the ring scaling circuit, it is not possible to produce sufficiently strong external fields without spoiling the remanence characteristics. Furthermore the whole assembly becomes too small for ease of manufacture and operation. In such cases a separate indicating ring of larger iron cores can be used to drive the needles, suitable shapes for such cores being shown in Figs. 3 and 4. The windings on each of these cores may be connected directly in series with the winding on a corresponding core in the ring scaling circuit. If required by the characteristics of the material used in the indicating ring cores, the inequality of the two currents which flow in each scaling ring core winding when the directions of magnetisation of the latter cores alternate may be compensated for by connecting a non-linear resistor across each indicating ring core winding. Two further methods of interconnecting the scaling and indicating rings are described later in this specification. The iron cores can be made small in volume (e.g. by making them from thin Radiometal or HCR sheet) so that they require very little driving power and do not interfere with the operation of the scaling circuit. Cores of the shape shown in Fig. 3 have been made from .004 in. thick Radiometal with an outside diameter of approximately 5/16 in. and an inside diameter of approximately 3/16 in. Bar cores of the shape shown in Fig. 4 have been made from .004 in. thick Radiometal 1/16 in. wide and 1 in. long.

Figure 3:
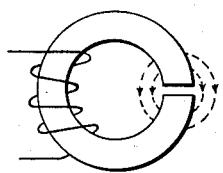
Figs. 3 and 4 show iron core shapes suitable for use in one form of the invention.
Figure 4:
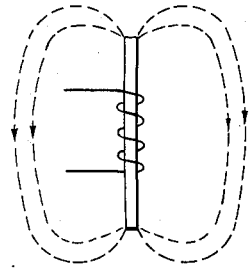

The method of indication, using iron cores similar to those shown in Figs. 3 and 4, can also be applied to ring scaling circuits in which the distinctive bistable element (e.g. a transistor) is conducting when the remaining elements are non-conducting, or vice versa. In this case the iron must not possess high remanence since a magnetising current is always present.

Figs. 5 and 6 show the further circuits mentioned above for driving the cores of the indicating ring from current pulses flowing in the corresponding stages of the magnetic memory ring scaling circuit.

In Fig. 5, 1, 2, 3 and 4 are consecutive stages of a magnetic memory ring scaling circuit the remaining elements of which are not shown. 21, 22, 23 and 24 are the corresponding high-remanence cores (shown in cross-section) of the indicating ring arranged in a circle having a compass needle 10 pivoted at the centre of the circle. Core 21 carries two windings 31 and 41, core 22 two windings 32 and 42, and so on. Windings 31 and 42 are connected in series opposition with each other between stages 1 and 2; windings 32 and 43 in series opposition with each other between stages 2 and 3, and so on. For the sake of clarity the full connections to cores 21 and 22 only are shown in the drawing.

Assume initially that core 21 is so magnetised that it presents a north pole in the plane of the compass needle, the remaining cores presenting south poles. Then the compass needle will assume the position shown, pointing towards core 21. In this condition stage 1 will be the stage of the ring scaling circuit whose core is magnetised in a different direction from those of the other stages of the circuit.

On the application of an input pulse to the scaling circuit the core of stage 1 reverses its direction of magnetisation and in so doing generates a current pulse which charges a condenser. At the end of the input pulse this condenser discharges through stage 2, reversing the direction of magnetisation of the latter's core so that stage 2 now becomes the "different" stage. In the embodiment of Fig. 5 this discharge current pulse is made to flow through windings 31 and 42, thus reversing the directions of magnetisation of cores 21 and 22. The needle therefore moves round and points towards core 22. Similarly the next input pulse reverses the directions of magnetisation of cores 22 and 23 so that the needle moves to a position pointing towards core 23.

The windings 31 and 42 may alternatively be connected in such a way that the condenser charging current in stage 1 serves to reverse the direction of the cores i.e. they may be connected in the lead marked A. In general any suitable current pulse flowing in a stage may be used.

In the embodiment of Fig. 6 the winding 31 on core 21 is connected in series opposition with winding 43 on core 23 (i.e. the next core plus one); winding 32 in series with winding 44 etc. In this arrangement two adjacent cores are similarly magnetised and the needle points midway between them. For example assuming stage 1 again to be the "different" stage, cores 21 and 22 will be magnetised differently from the other cores and the needle will point between them as shown. On recepit of the next input pulse, the current which passes from stage 1 to stage 2 changes the direction of magnetisation of cores 21 and 23, so that the needle moves to a position pointing midway between cores 22 and 23. This embodiment has the advantage over that of Fig. 5 that the torque acting on the compass needle is approximately doubled and the field is spread over a greater arc of the circle, resulting in more reliable operation.

For resetting the system to zero, the cores may each be provided with a third winding (not shown).

The principle employed in theembodiment of Fig. 6, i.e. of having two adjacent cores similarly magnetised, may be used where standing currents are available in the scaling stages, as in a transistor ring scaling circuit, and non-remanent cores are used in the indicating system. In this case two windings on adjacent cores are simply connected in series with the stage.

I claim:

1. In combination, a ring scaling circuit of bistable stages wherein at the conclusion of a count one stage is in a given stable state different from the stable state of the remaining stages, and an arrangement for indicating said one stage, said arrangement comprising a pivoted-needle device of magnetisable material and means for establishing a plurality of external magnetic fields spaced round said device, said means including means for controlling each field by a corresponding stage of the scaling circuit so that the state of each field is dependent on the state of the corresponding stage.

2. In combination, a magnetic memory ring scaling circuit of bistable stages, each stage comprising a high-remanence magnetic core, wherein at the conclusion of a count the core in one stage is left magnetised in a different direction from the cores in the remaining stages, and an arrangement for indicating said one stage, said arrangement comprising a compass-needle device and means for establishing a plurality of external magnetic fields spaced round said compass-needle device, said means including means for controlling each field by a corresponding stage of the scaling circuit so that the direction of each field depends on the direction of magnetisation of the core in the corresponding stage.

3. A combination as claimed in claim 2 wherein the cores in said stages are adapted to constitute the means for establishing the plurality of external magnetic fields.

4. A combination as claimed in claim 2 wherein the means for establishing the plurality of external magnetic fields comprises a plurality of separate high-remanence indicating cores, each indicating core having a winding connected in series with a connection in the corresponding stage.

5. In combination, a ring scaling circuit of bistable stages wherein at the conclusion of a count one stage is conducting when the remaining stages are non-conducting, and an arrangement for indicating said one stage, said arrangement comprising a pivoted-needle device of magnetisable cores spaced round said device, each core having an energising winding connected in series with a connection in a corresponding bistable stage and being adapted to produce when energised an external magnetic field, whereby the existence of each field depends on whether the corresponding stage is conducting.

References Cited in the file of this patent

UNITED STATES PATENTS

| 1,069,355 | Tanaka | Aug. 5, 1913 |
| 1,091,653 | Hall | Mar. 31, 1914 |
| 2,778,006 | Guterman | Jan. 15, 1957 |

FOREIGN PATENTS

| 584,521 | Great Britain | Jan. 16, 1947 |